(12) United States Patent
Müller et al.

(10) Patent No.: US 12,347,219 B2
(45) Date of Patent: Jul. 1, 2025

(54) CAMERA BASED CODE READER AND METHOD OF READING OPTICAL CODES

(71) Applicant: SICK AG, Waldkirch (DE)

(72) Inventors: Romain Müller, Waldkirch (DE); Hannes Ruf, Waldkirch (DE); Johannes Rheinboldt, Waldkirch (DE)

(73) Assignee: SICK AG, Waldkirch (DE)

(*) Notice: Subject to any disclaimer, the term of this patent is extended or adjusted under 35 U.S.C. 154(b) by 408 days.

(21) Appl. No.: 17/967,103

(22) Filed: Oct. 17, 2022

(65) Prior Publication Data
US 2023/0122174 A1 Apr. 20, 2023

(30) Foreign Application Priority Data
Oct. 18, 2021 (DE) .......... 102021126906.7

(51) Int. Cl.
*G06V 30/224* (2022.01)
*G06T 7/11* (2017.01)
*H04N 23/80* (2023.01)

(52) U.S. Cl.
CPC .......... *G06V 30/224* (2022.01); *G06T 7/11* (2017.01); *H04N 23/80* (2023.01)

(58) Field of Classification Search
CPC ......... G06V 30/224; G06T 7/11; H04N 23/80
See application file for complete search history.

(56) References Cited

U.S. PATENT DOCUMENTS 9,805,240 B1* 10/2017 Zheng ................. G06K 7/10722
10,007,823 B2* 6/2018 Deliwala ................. A61B 5/00
10,146,923 B2* 12/2018 Pitkänen .......... G06Q 20/40145
10,198,648 B1* 2/2019 Bradley ................. G06V 10/42
10,229,301 B2* 3/2019 Cumoli ............ G06K 19/06028
10,628,648 B2* 4/2020 Negro ................. G06K 7/1417
10,929,670 B1* 2/2021 Troy ..................... G06V 20/653
(Continued)

FOREIGN PATENT DOCUMENTS

DE 102007030597 A1 1/2009
EP 1365577 A1 11/2003
(Continued)

OTHER PUBLICATIONS

Soft microprocessor, Wikipedia, https://enwikipedia.org/w/index.php?title=Soft_microprocessor&oldid, updated Dec. 20, 2020, printed Mar. 11, 2022.

*Primary Examiner* — Gregory M Desire
(74) *Attorney, Agent, or Firm* — Nath, Goldberg & Meyer; Jerald L. Meyer

(57) ABSTRACT

A camera based code reader is provided that has an image sensor for detecting image data having an optical code, a memory for storing image data, a first processing unit for transmitting the image data from the image sensor to the memory in an image data stream, and a second processing unit that is configured for a decoding in which the stored image data are evaluated to read the code content of the optical code, In this respect, the first processing unit is configured for at least one auxiliary function in which the first processing unit reads back at least some of the image data from the memory and writes a pre-processing result back to the memory; and in that the second processing unit is configured to invoke the auxiliary function of the first processing unit as required to assist the decoding.

15 Claims, 1 Drawing Sheet

(56) References Cited

U.S. PATENT DOCUMENTS

Figure 1:
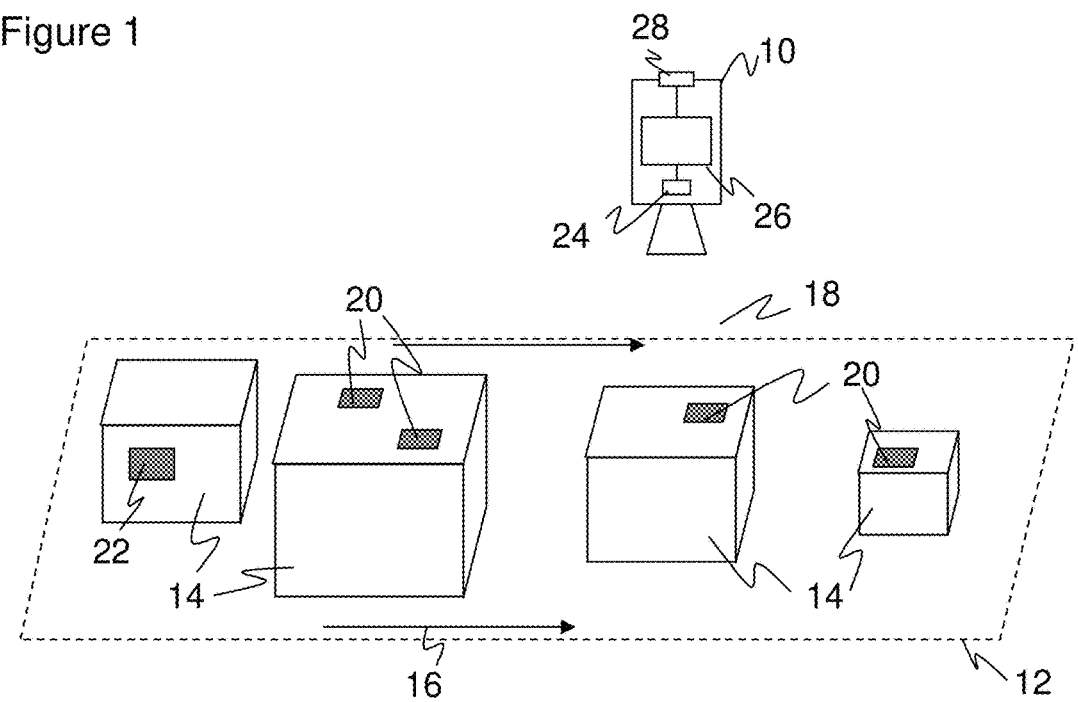

| | | | |
|---|---|---|---|
| 11,301,659 B2* | 4/2022 | Nagata | G06K 7/1413 |
| 11,308,479 B2* | 4/2022 | Sogawa | G06K 7/1417 |
| 2021/0203786 A1 | 7/2021 | Singhal et al. | |

FOREIGN PATENT DOCUMENTS

| | | |
|---|---|---|
| EP | 2003599 A1 | 12/2008 |
| EP | 2555160 A1 | 2/2013 |
| EP | 3916633 A1 | 12/2021 |

* cited by examiner

CAMERA BASED CODE READER AND METHOD OF READING OPTICAL CODES

The invention relates to a camera based code reader and to a method of reading optical codes.

Code readers are known from supermarket checkouts, for automatic parcel identification, for sorting mail shipments, from baggage handling at airports, and from other logistics applications. A camera-based code reader records images of the objects having the codes located thereon by means of an image sensor and image evaluation software extracts the code information from these images. Camera-based code readers also cope without problem with different code types than one-dimensional barcodes which also have a two-dimensional structure like a matrix code and provide more information.

In an important application group, the objects bearing a code are conveyed past the code reader. Image data that overlap more or less depending on the recording frequency and on the conveying speed are repeatedly recorded by the image sensor. A code reader is frequently a part of a more complex code reading system. A plurality of code readers are thus frequently provided at a reading tunnel to record objects from a plurality of sides or from all sides. Additional sensors are provided here such as an encode for determining the conveyor feed or the conveyor speed or a laser scanner that measures the geometry of the objects.

The images to be processed are becoming larger and larger thanks to the continuing development in camera and image sensor technology. The huge amounts of data present challenges for the limited processing capacities and bandwidths for forwarding to and processing in a camera under real time conditions with. In this respect, the use of heterogeneous processing architectures, i.e. a combination of a microprocessor (central processing unit, CPU) having, for example, an FPGA (field programmable gate array), a DSP (digital signal processor), a GPU (graphics processing unit), or a so-called AI accelerator (neural processing unit, NPU, tensor processing unit TPU).

The combination with an FPGA that is responsible for the reading of the image data from the image sensor has particularly proven itself here. The FPGA is additionally connected to a memory of the microprocessor via a high speed interface (peripheral component interconnect, PCI, PCI express, PCIE, mobile industry processor interface, MIPI). The image data are thus transmitted into the memory by the FPGA via DMA (direct memory access). This process of reading and saving is called streaming. The decoder implemented by means of a CPU can then access the stored images and read the codes downstream. The streaming approach is not easily possible using other above-named additional modules of a heterogeneous architecture that as a rule themselves already require a stored image while the FPGA can read and further process image data directly pixel-wise.

The image data are preferably already pre-processed directly, on the fly, in the FPGA and in this respect additional information or metadata can be saved for the microprocessor with the image data. Typical pre-processing steps relate to the binarization by which a black and white image is acquired from a gray scale image or to the segmentation in which regions of interest (ROIs) having code candidates are located. EP 2 003 599 A1 thus describes an optoelectronic sensor and a method for the detection of codes in which a binarizer is already configured for a conversion of a color image or a gray scale image into a binary image during the reception and/or in real time in that a respective read in section is binarized even while the further sections are read in. EP 2 555 160 B1 locates regions of interest or code candidates using a contrast measure in a pre-processing on an FPGA. In the still unpublished European application having the file number 20176228.3, first layers of a neural network are already run through on an FPGA for segmentation during the reading in. EP 1 365 577 A1 discloses a method of operating an optoelectronic sensor in which an image is already compressed during the reception.

In this respect, the capability of the FPGA is respectively used to carry out a number of simple processing operations such as matrix multiplications in parallel in real time. Sequential, more complex processing operations of the decoder are reserved for the microprocessor that makes use of the provided image data and possible pre-processing results for this purpose. However, there are cases of, for instance, extreme module sizes in which the decoder encounters problems and has to carry out processing intensive operations on a very large number of pixels for a promising reading attempt. The available time window for the decoding up to the running in of new image data with further codes is possibly no longer sufficient under such circumstances. On the other hand, the FPGA cannot simply carry out corresponding processing steps prophylactically on all incoming image data during the streaming. On the one hand, this would trigger unnecessary processing effort since a number of codes would also be read without the additional processing steps. In addition, suitable processing steps have to be selected in dependence on the individual cases and only the decoder has the necessary information, in particular after first futile reading attempts, to decide on the steps suitable for the current special case.

It is therefore the object of the invention to further improve the code reading in a heterogeneous architecture.

This object is satisfied by a camera based code reader and by a method of reading optical codes in accordance with the respective independent claim. Optical codes are, for example, barcodes or 2D codes in accordance with any desired standard. An image sensor records image data with a plurality of pixels, typically at high resolution using a line sensor having several kilopixels. In operation, the code reader detects objects provided with optical codes so that the image data then contain at least one region having an optical code.

A first pre-processing unit of the code reader reads in the image data of the image sensor, that is the preferably high resolution raw image, and transmits the image data to a memory. The reading and saving takes place as an image data stream in groups of adjacent pixels and is called streaming. The image data are possibly pre-processed directly during the streaming in dependence on the embodiment and correspondingly processed image data or additional information or metadata are stored during the pre-processing. The code reader additionally comprises a second processing unit for decoding, that is for an evaluation or processing of the image data stored in the memory and possible pre-processing results to read the code content of the optical codes in the image data.

The invention starts from the basic idea of additionally using the first processing unit to assist the second processing unit during the decoding. The first processing unit thereby has a dual function, namely additionally as a coprocessor in an expansion of the previous function of streaming, i.e. the reading in and storing of image data. The first processing unit is correspondingly configured for at least one auxiliary function that again reads back at least some of the image data already streamed into the memory to carry out a pre-processing and to save the result of the pre-processing again. The auxiliary function is only triggered as required by the second pre-processing unit if the decoder needs it for the decoding of the current code. The first processing unit then works in its second role as a coprocessor and assists the second processing unit with the auxiliary function. The result of the auxiliary function can be prepared image data and/or additional information or metadata. The second processing unit accesses these results in the memory to continue the decoding, optionally while again making use of an auxiliary function of the first processing unit.

The invention has the advantage that the second processing unit can be relieved. This is particularly advantageous for pixel based operations that are thus required multiple times and that are carried out substantially more efficiently by the first processing unit. The running time is thus improved or a processing within the available time window only made possible at all. Algorithms can even be opened up for the decoder that would not be considered at all in accordance with the known procedure since sufficient processing and time resources are not available to the second processing unit for this purpose.

The first processing unit preferably has an FPGA (field programmable gate array) and/or the second processing unit has a microprocessor (CPU). An FPGA is particularly suitable for streaming and for a real time processing of large data quantities using comparatively simple individual computing operations. A CPU, in contrast, is a lot more flexible and capable per se of more complex computing steps and this is of advantage for the decoding. If the CPU encounters a problem during the decoding that still again requires a plurality of simple processing operations, for instance the manipulation on a pixel level in a larger image region, it can make use of the auxiliary function of the FPGA for this purpose.

The first processing unit preferably reads a respective image row or a portion thereof from the image sensor and stores it in the memory. The image is accordingly read in or streamed row-wise by the image sensor and the processing takes place with a time orientation. For pre-processing relating to more than one image row, for example folding by a filter kernel, the first processing unit can have an image buffer in which a corresponding number of image rows are buffered in a rolling manner. In principle, image columns can also be worked with in the same way instead of image rows. This is here only understood as a difference in the definition of the coordinates and not distinguished.

The first processing unit is preferably configured to already pre-process respective image data read in by the image sensor before the transfer into the memory, even while further data are read in by the image sensor. The first processing unit is thus configured for a pre-processing on the fly or as early as during the streaming. This pre-processing must be clearly distinguished from the auxiliary function. It so-to-say takes place directly at the source and even before the decoder of the second processing unit has obtained access to the image data at all. In contrast, an auxiliary function is directly demanded by the decoder non the basis of image data already stored by the first processing unit.

The first processing unit preferably has a first partition for transmitting image data from the image sensor to the memory and a second partition for executing auxiliary functions. The two functions of streaming and coprocessing or of transmitting image data and executing auxiliary functions are thus clearly separated within the first processing unit. Separate areas or regions are in particular provided for this purpose on the FPGA. There can be further partitions, preferably a third partition having algorithms that are required by both partitions under certain circumstances.

The first partition and the second partition are preferably operated at different cycle frequencies. This is technically possible thanks to a clear separation. In this manner, for example, a limited energetic or thermal budget can be shared in a very targeted manner. An adaptation of the cycle frequency preferably relates to the auxiliary function since the streaming has to keep up with the typically fixed framerate and is less situative and adaptable.

The first processing unit is preferably configured for a segmentation with a location of regions of interest with code candidates as the auxiliary function. This is an exemplary coprocessor function or auxiliary function. One or more such auxiliary functions can be implemented. Content-wise, some processing of an auxiliary function can already be carried out during the streaming. This is, however, then not an auxiliary function in the sense understood here since an auxiliary function is demanded or triggered for already stored image data in a targeted manner by the decoder after the streaming. The segmentation, in which regions of interest (ROIs) having presumed optical codes or code candidates are located, is at times already carried out on the fly during the streaming as mentioned in the introduction. Alternatively, it is the decoder that first demands the segmentation or that allows a refined segmentation or a segmentation carried out under different parameters to be carried out in addition to a presegmentation already carried out during streaming.

The first processing unit is preferably configured for a resolution increase as an auxiliary function. This is a further exemplary coprocessor function or auxiliary function and the general remarks of the previous paragraph apply analogously to this and to further auxiliary functions. A resolution increase corresponds to a subsequent or digital zoom function. Numerous approaches are known per se for this under terms such as upsampling and superresolution. The second processing unit of the decoder, however, conventionally frequently does not have the required resources so that a corresponding auxiliary function substantially accelerates the resolution increase or only makes it possible at all. The resolution increase can relate to a whole image, to a partial region, in particular an ROI having a code candidate, or only to a code section.

The first processing unit is preferably configured for a rotation of an image section as an auxiliary function. This is a further exemplary coprocessor function or auxiliary function. The formulas or algorithms for a rotation are generally known. It is, however, a pixel based processing that the second processing unit mostly could not perform so that the assistance of the first processing unit represents a large improvement step.

The first processing unit is preferably configured as an auxiliary function for the processing with a filter, in particular a sharpness filter, an edge filter, or noise or smoothing filter. The folding of an image or of an image region using a filter kernel requires a plurality of single operations that are efficiently performed by the first processing unit but would overstrain the second processing unit within the specified time budget. An image can thus be sharpened, an edge detection, and thus a module detection, prepared, or a deblurring carried out.

The first processing unit is preferably configured for a template matching with code sections as an auxiliary function. Template matching enables the recognition of code sections or an at least partial decoding directly on the image data. While the decoder typically works with binarized black and white image data, the template matching can be carried out on the underlying color or gray scale data.

The first processing unit is preferably configured as the auxiliary function for a perspective correction or for a distortion correction. An unfavorable perspective of a recorded code or a distortion error of the objective of the image sensor is thereby compensated. This respectively requires operations on a pixel level that are efficiently implemented as an auxiliary function by the first processing unit.

The method in accordance with the invention can be further developed in a similar manner and shows similar advantages in so doing. Such advantageous features are described in an exemplary, but not exclusive manner in the subordinate claims dependent on the independent claims.

Figure 2:
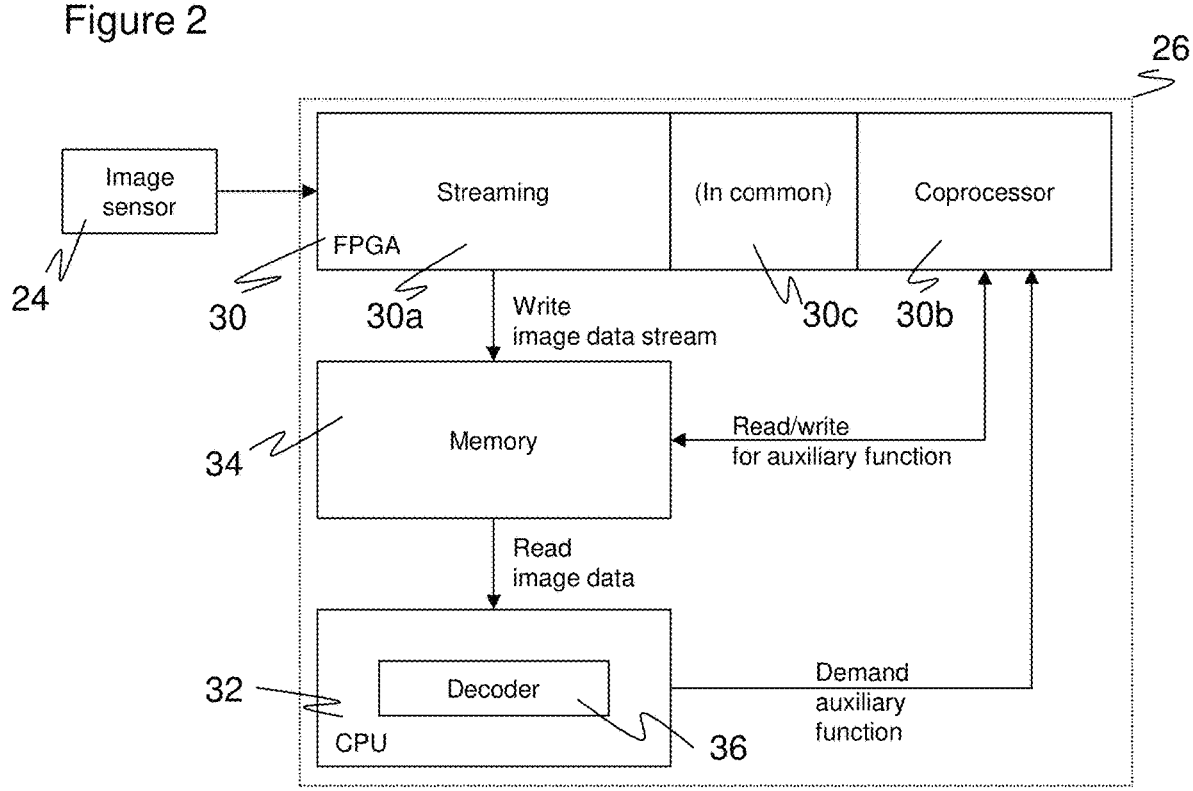

The invention will be explained in more detail in the following also with respect to further features and advantages by way of example with reference to embodiments and to the enclosed drawing. The Figures of the drawing show in:

FIG. 1 a schematic overview representation of the exemplary assembly of a camera based code reader above a conveyor belt; and FIG. 2 a schematic representation of a heterogeneous architecture having an FPGA as a streamer and a CPU as a decoder in which the FPGA additionally acts as a coprocessor.

FIG. 1 shows a camera based code reader 10 which is mounted above a conveyor belt 12 which conveys objects 14 through the detection zone 18 of the code reader 10, as indicated by the arrow 16. The objects 14 bear code codes 20 on their outer surfaces which are detected and evaluated by the code reader 10. The codes 20 can only be recognized by the code reader 10 when they are affixed to the upper side or at least in a manner visible from above. Differing from the representation in FIG. 1, a plurality of code readers 10 can be installed from different directions for the reading of a code 22 affixed somewhat to the side or to the bottom in order to permit a so-called omnireading from all directions. The arrangement of the plurality of code readers 10 to form a reading system mostly takes place as a reading tunnel in practice. This stationary use of the code reader at a conveyor belt is very common in practice. The invention, however, relates to the processing of image data or to the code reader 10 itself so that this example may not be understood as restrictive.

The code reader 10 detects image data of the conveyed objects 14 and of the codes 20 by an image sensor 24 and said image data are further processed by a control and evaluation unit 26 by means of image evaluation and decoding processes. The control and evaluation unit 26 will be described in more detail immediately with reference to FIG. 2. The code reader 10 outputs information such as read codes or image data via an interface 28.

FIG. 2 shows the control and evaluation unit 26 and its integration in a schematic representation. The control and evaluation unit 26 comprises a first processing unit 30 that will be explained in the following for the example of an FPGA (field programmable gate array) and a second processing unit 32 that will be explained in the following for the example of a CPU (central processing unit). The first processing unit 30 has at least two sections, with the first section 30a being marked by streaming and the second section 30b being marked by coprocessor, and can comprise an optional third common section 30c. The second processing unit 32 has a decoder 36 for reading optical codes using image data.

The first processing unit 30 is, on the one hand, connected to the image sensor 24 (imager interface) and, on the other hand, has a high speed interface in the direction of the second processing unit 32 (PCI, PCIE, MIPI). In this respect it is in particular relevant to the invention that both processing units 30, 32 access a memory 34 for image data and processing results. The corresponding reading and writing procedures preferably take place by means of DMA (direct memory access). The memory 34 can be understood as at least functional and, depending on the embodiment, also structurally as part of the CPU 32. A further connection between the two processing units 30, 32 enables the invoking of an auxiliary function.

In operation, the image sensor 24 now respectively records a new image or a new image section. It can be a rectangular image of a matrix sensor, but individual or multiple image rows of a line sensor are also conceivable that then successively produce a total image in the course of the relative movement between the code reader 10 and the object 14. The image data of the image sensor 24 are read by the first processing unit, here specifically by its first section 30a, and are transmitted or streamed to the memory 34.

The decoder 36 of the second processing unit 32 accesses the image data in the memory 34 to read the content of the optical codes recorded with the image data. In some cases, pixel and processing intensive operations are required for this for which a CPU is not especially suited and that could be carried out much more efficiently and quickly in the first processing unit 30. In such cases, the decoder 35 can decide to be assisted by the first processing unit 30 as a coprocessor. The first processing unit 30 thus acquires a dual function as a streamer and a coprocessor.

The assisting function is called an auxiliary function. The second section 30b of the first processing unit 30 is now responsible for this. After a corresponding invoking by the second processing unit 32, the first processing unit 30 again accesses the already stored image data of the memory 34 or uploads them back to the first processing unit 30 again. The latter executes the auxiliary function and again writes the results to the memory 34. The decoder 36 of the second processing unit 32 can continue the code reading on this basis by accessing the memory 34.

The auxiliary function preferably relates to the manipulation of image data on a pixel level, but can instead or additionally also carry out evaluations and produce corresponding additional information or metadata that are then likewise written to the memory 34. The decoder can also carry out desired parameterizations of the auxiliary function via such metadata or the parameterization takes place via an interface suitable for this purpose of the first processing unit 30 (register interface).

Preprocessing is also already conceivable during the streaming so that the image data and possible associated metainformation already transmitted to the memory for the first time by the first section 30a of the first processing unit 30 and possible associated metainformation represent a pre-processing result Such pre-processing steps are, however, always carried out and always for all the image data in the same way. The decoder 36 could not even intervene and evaluate the specific image data at this time An auxiliary function in contrast is only executed as required on the basis of the current image data and is moreover directly parameterizable for these image data.

An example for a pre-processing that can be carried out during the streaming and/or thereafter as an auxiliary function is the segmentation in which regions of interest (ROIs) can be located using code candidates. This generally takes place on the basis of general criteria during the streaming or on the fly; as an auxiliary function, in contrast, it is specifically also possible only for some of the image data and, for example, using a particularly complex method for image regions that are difficult to interpret.

As already explained, the first processing unit 30 had different partitions or sections 30a-c. The first section 30a is responsible for the streaming and optionally for pre-processing and generating metadata during the streaming; the second section 30b is responsible for working through auxiliary functions as a coprocessor. An optional third section 30c is responsible for functions used in common that are required both during the streaming and during the execution of auxiliary functions. Sections 30a-c are preferably not only to be understood functionally, but are rather actually separately implemented and consequently form real partitions by separations, in particular into different regions or surface sections. Sections 30a-c can even be operated at a different cycle frequency if required. This is in particular of interest with a limited energetic or thermal budget to balance and optimize the total performance of the different functions.

Some examples for auxiliary functions, not named exclusively, will be described in the following. At least one auxiliary function is provided, but there could also be a plurality of auxiliary functions in any desired combinations. The decoder of the second processing unit 32 equally has the choice from case to case as to whether an auxiliary function is requested and which individual auxiliary function or combination of auxiliary functions that would be. An auxiliary function can also be invoked multiple times. An example here could be a repeating layer of a neural network that is implemented by a multiple invoking of the corresponding auxiliary function with respective changes of the weights.

An example for an auxiliary function is a resolution increase. This corresponds to a zoom function that is not, however, based on an optical enlargement, but rather subsequently refines the resolution of the image data. The decoder 36 has a need for this auxiliary function, for example, in the case of particularly small module sizes, that is when a code element is represented by two few pixels. Algorithms for an upsampling by interpolation, for instance bicubically, bilinearly, linearly, or by means of splines are known per se. Image data, for example gray scale values, from the memory 34 are again transmitted back to the first processing unit 30 or to its second section 30b, preferably together with a desired factor of the resolution increase and the desired interpolation method. Factors two, four, . . . are ideal for an interpolation. Other approaches have been described in the literature under the headword superresolution for which in particular neural networks are used.

A further example for an auxiliary function is a turning or a rotation of an image region or code. Individual row segments are preferably consecutively transmitted back from the memory 34 into the first processing unit 30 for this purpose, with the decoder 36 determining the desired angle of rotation and communicating it to the first processing unit 30. Only the relevant row segments are preferably transmitted and processed in dependence on the angle of rotation. Metainformation such as the location of the code within the row segments can also be sent in both directions. In an expansion of the rotation in the plane, a perspective correction is also conceivable.

An example for an auxiliary function is a filter. The folding by a filter kernel is in principle a matrix operation and an FPGA is therefore particularly suitable for this. There are numerous possibilities here that can relate to noise, deformations and distortion, motion blur, and the like. For example, when the code structures show too poor a signal to noise behavior due to noise, a sharpness filter can be used. In this respect, possible parameters are a mean gray value, largest and smallest gray values, and further statistical parameters such as the standard deviation. An edge recognition can be prepared and improved by corresponding filters such as a Sobel filter. Blur or motion blur can be at least partially compensated by suitable filters (Lucy Richardson deconvolution, deblurring). A geocorrection, in particular for the compensation of distortion errors, can also be understood as a filter. It is conceivable to determine, in addition to or instead of a filter, certain characterizing values such as a degree of sharpness and to deliver metainformation back. The decoder 36 can then evaluate whether a reading attempt will be successful or which further measures and possibly auxiliary functions are still required beforehand. Effects similar to said filters can also be achieved with the aid of neural networks.

A further example for an auxiliary function is a template matching. It is attempted with this to locate and decode a cod segment directly on the color or gray scale data. In this connection, parameters such as the module size, the templates, statistical values, and the code type are of interest. Neural networks are also suitable for these auxiliary functions.

The invention claimed is:

1. A camera based code reader that has an image sensor for detecting image data having an optical code, a memory for storing image data, a first processing unit for transmitting the image data from the image sensor to the memory in an image data stream, and a second processing unit that is configured for a decoding in which the stored image data are evaluated to read the code content of the optical code,
   wherein the first processing unit is configured for at least one auxiliary function in which the first processing unit reads back at least some of the image data from the memory and writes a pre-processing result back to the memory so that the first processing unit takes a dual function as a streamer for transferring the image data from the image sensor to the memory and as a coprocessor for performing the at least one auxiliary function; and
   wherein the second processing unit is configured to invoke the at least one auxiliary function of the first processing unit as required to assist the decoding when needed for decoding the current code and to access the result of the at least one auxiliary function to continue decoding.

2. The camera based code reader in accordance with claim 1,
   wherein the first processing unit has an FPGA.

3. The camera based code reader in accordance with claim 1,
   wherein the second processing unit has a microprocessor.

4. The camera based code reader in accordance with claim 1,
   wherein the first processing unit respectively reads an image row or a portion thereof from the image sensor and stores it in the memory.

5. The camera based code reader in accordance claim 1,
   wherein the first processing unit is configured to already pre-process respective image data read in by the image sensor before the transfer into the memory, even while further data are read in by the image sensor.

6. The camera based code reader in accordance with claim 1,
wherein the first processing unit has a first partition for transmitting image data from the image sensor to the memory and a second partition for executing auxiliary functions.

7. The camera based code reader in accordance with claim 6,
wherein the first partition and the second partition are operated at different cycle frequencies.

8. The camera based code reader in accordance with claim 1,
wherein the first processing unit is configured for a segmentation with a location of regions of interest with code candidates as the at least one auxiliary function.

9. The camera based code reader in accordance with claim 1,
wherein the first processing unit is configured for a resolution increase as the at least one auxiliary function.

10. The camera based code reader in accordance with claim 1,
wherein the first processing unit is configured for a rotation of an image section as the at least one auxiliary function.

11. The camera based code reader in accordance with claim 1,
wherein the first processing unit is configured for the processing with a filter as the at least one auxiliary function.

12. The camera based code reader in accordance with claim 11,
wherein the at least one auxiliary function is selected from the group of members comprising a sharpness filter, an edge filter, a noise filter and a smoothing filter.

13. The camera based code reader in accordance with claim 1,
wherein the first processing unit is configured for a template matching as the at least one auxiliary function.

14. The camera based code reader in accordance with claim 1,
wherein the first processing unit is configured for a distortion correction as the at least one auxiliary function.

15. A method of reading optical codes in which image data having an optical code are detected by an image sensor, are transmitted from a first processing unit in an image data stream from the image sensor to a memory, and are decoded in a second processing unit, with the stored image data being evaluated to read the code content of the optical code,
wherein the second processing unit invokes at least one auxiliary function of the first processing unit as required to assist the decoding when needed for decoding the current code and to access the result of the at least one auxiliary function to continue decoding;
and in that the first processing unit reads at least some of the image data back from the memory on the execution of the at least one auxiliary function and writes a pre-processing result back to the memory so that the first processing unit takes a dual function as a streamer for transferring the image data from the image sensor to the memory and as a coprocessor for performing the at least one auxiliary function.

* * * * *